(12) United States Patent
Kumar et al.

(10) Patent No.: US 8,756,206 B2
(45) Date of Patent: Jun. 17, 2014

(54) UPDATING AN INVERTED INDEX IN A REAL TIME FASHION

(75) Inventors: Abhas Kumar, Redmond, WA (US); Pratibha Permandla, Redmond, WA (US); Gaurav Sareen, Bellevue, WA (US); Anna Timasheva, Seattle, WA (US); Deepak Shankar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/292,793

(22) Filed: Nov. 9, 2011

(65) Prior Publication Data

US 2012/0059806 A1    Mar. 8, 2012

Related U.S. Application Data

(63) Continuation of application No. 12/368,771, filed on Feb. 10, 2009, now Pat. No. 8,082,258.

(51) Int. Cl.
*G06F 17/30* (2006.01)
(52) U.S. Cl.
USPC .......................................................... 707/690
(58) Field of Classification Search
USPC ........................................ 707/690, 696, 742
See application file for complete search history.

(56) References Cited

U.S. PATENT DOCUMENTS

2004/0225963 A1* 11/2004 Agarwal et al. ............... 715/530

* cited by examiner

*Primary Examiner* — Joshua Bullock
(74) *Attorney, Agent, or Firm* — Dave Ream; Doug Barker; Micky Minhas

(57) ABSTRACT

Systems and methods for regularly updating portions of a merged index are provided. Initially, upon receiving an indication that modifications have occurred to content of web-based documents, dynamic update of index (DUI) objects that identify the documents and expose the modified content are composed by ascertaining relative positions of the modified content within the documents, and packaging identifiers of the documents, the relative positions, and metadata underlying the modified content into a message. The DUI objects are applied to an overloading index that maintains structured records of recent modifications. In particular, portions of the overloading index are targeted utilizing the document identifiers and the relative positions specified by the DUI object, thereby updating the targeted portions within the overloading index corresponding to the modified content without rewriting the entire overloading index. Periodically, an association process is invoked for grouping the merged index with the overloading index for search purposes.

20 Claims, 5 Drawing Sheets

UPDATING AN INVERTED INDEX IN A REAL TIME FASHION

CROSS-REFERENCE TO RELATED APPLICATIONS

This application is a Continuation Application and claims the benefit of U.S. Ser. No. 12/368,771, filed Feb. 10, 2009, entitled "Updating an Inverted Index in a Real Time Fashion," which is incorporated by reference herein.

BACKGROUND

Often, indexes are utilized to facilitate effective navigation of the web. These indexes are frequently updated to in accordance with changes to content of documents (e.g., web pages) that are within the scope of the index. In instances, web crawlers are employed to browse these documents at predetermined time intervals to discover the changes to the content. These time intervals may depend on the type or importance of a particular document, or the amount of documents within the scope of the index. Typically, the entire index is replaced each time the web crawler finds a change to content of a document, no matter how insignificant. Because, the process of replacement involves pulling the index offline for an extended period and performing a full merge of the index, the time intervals may be lengthened to avoid the need to create and rely on a plurality of replicate indexes that serve the users when the subject index is down. Further, performing a full merge frequently (e.g., daily) is prohibitively expensive as it consumes a large amount of computing resources. Accordingly, indexes are not updated often enough to effectively track the changes to the content of the documents within their scope.

Because current solutions for updating an index to correspond with the content of the tracked documents, or other data, incur a substantial delay prior to updating, recent changes to terms of a web page (e.g., prices appended to items for online sale), or updates to other structured data (e.g., documents of various formats, non-web sources) are not reflected by the index. These shortcomings of the delayed updating are exaggerated when the index is expansive in size, covering a multitude of documents stored at a multitude of websites. As such, employing emerging technologies to propagate changes in content to the index in real-time without replacing the entire index would allow for more frequent updates to the index and would enhance the user's experience when searching the documents. Further, this novel index may be capable of handling data

SUMMARY

Embodiments of the present invention relate to systems, methods, and computer-readable media for dynamically updating an overloading index (e.g., inverted index for searching documents associated with websites) by recording changes to content within documents that are searchable by the overloading index. Initially, upon receiving an indication that a modification has occurred to the content of one or more documents, a dynamic update of index (DUI) object that identifies the documents and exposes the modified content may be composed. Composing the DUI object may involve acquiring an identifier of the documents that received the modification, ascertaining a relative position of the modified content within the documents, and packaging into a message the identifier, indicia of the relative position, and a representation of metadata underlying the modified content.

The DUI object may be pushed to an agent configured to initiate an update process that dynamically applies the DUI object to an overloading index that maintains a structured record of recent modifications. In embodiments, the DUI object includes metadata related to a term changed in the modification and a relative location of the changed term. Because the merged index already knows the absolute location of the documents identified by the DUI chunk, this mapping may be utilized to translate the relative location to an absolute location, which is saved to the overloading index. Further, association process is invoked for grouping the merged with the overloading index for purposes of searching. The merged index and the overloading index may then be queried by search engines for updated content that is within the scope of the merged index.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention are described in detail below with reference to the attached drawing figures, wherein.

DETAILED DESCRIPTION

Figure 1:
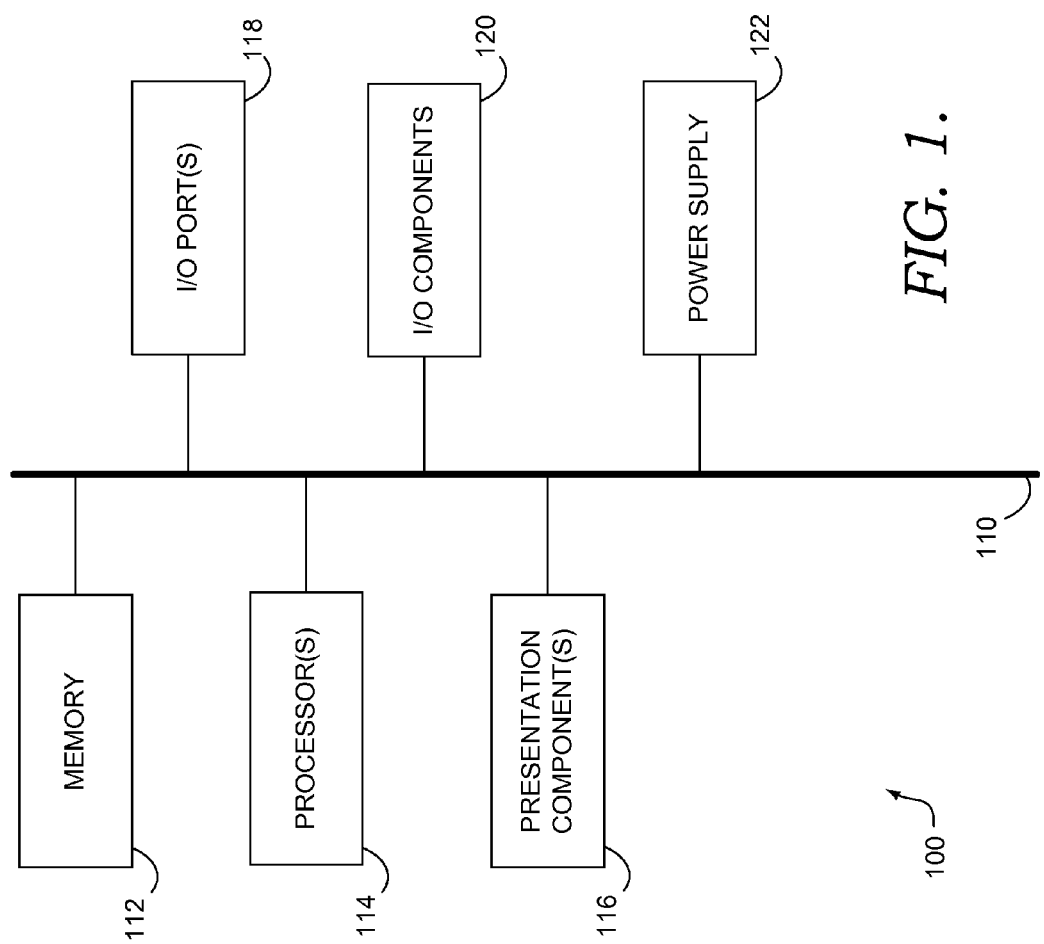
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

The present invention relates to systems, methods, and computer readable media for dynamically updating an overloading index with updated content to generate an updated overloading index. The updated content is communicated via a dynamic update of index (DUI) object that identifies documents searchable via the merged index and exposes a relative position of the recently-modified content with reference to the documents. This information carried in the DUI object is dynamically written to an overloading index. As such, the overloading index is updated with just the most recent modifications communicated in the DUI object, as opposed to completely rewriting the entire overloading index each time a modification occurs.

Accordingly, in one aspect, the present invention provides one or more computer-readable media having computer-executable instructions embodied thereon. When executed, the computer-executable instructions perform a method for dynamically targeting and updating portions of an overloading index utilizing the DUI object, which transports an indication of modified content of one or more documents. In embodiments, the method includes receiving an indication that a modification has occurred to the content of the documents, and generating the DUI object that identifies the documents and exposes the modified content. By way of example, a modification occurring to the content of the documents involves a curator-initiated change to at least one term within a web page posted online. Consistent with this example, the DUI object articulates the indicia of relative position of the modified term within the content of the posted web page, as well as a representation of the metadata underlying the modified term.

Generating the DUI object may include acquiring an identifier of the documents that received the modification, ascertaining a relative position of the modified content within the documents, and composing the DUI object that includes the identifier, indicia of the relative position, and a representation of metadata underlying the modified content. The method may further include publishing the DUI object to a manager component that instructs an agent component to provide a request to download the DUI object, and receiving the request from the agent component. In response to the request, the DUI object is pushed to the agent component. Typically, the agent component is configured for initiating an updating process that applies the DUI object to overloading index. In instances, the agent component is configured for invoking updates to the portions of the overloading index that are targeted by the DUI object.

In another aspect, the present invention provides for a computerized system for performing an update process and a merge process. As more fully discussed below, the computer system includes a processing unit coupled to a computer storage medium, where the computer storage medium stores a plurality of computer software components executable by the processing unit. Some of these computer software components include a publishing component, a primary agent, and an index-file manager. Generally, the publishing component is configured to generate the DUI object upon receiving an indication that a modification has occurred to content of one or more documents with a monitored set of documents. In embodiments, the DUI object includes an identifier of the documents and indicia of a relative position of the modified content therein. The primary agent is configured to initiate an update process that comprises retrieving the DUI object and dynamically applying the DUI object to overloading index. In operation, the overloading index maintains a structured record of additions, deletions, and modifications to the set of documents.

In embodiments, the DUI object includes metadata related to a term changed in the modification and a relative location of the changed term. Because the merged index already knows the absolute location of the documents identified by the DUI chunk, this mapping may be utilized to translate the relative location to an absolute location, which is saved to the overloading index. The index-file manager is configured to invoke an association process for grouping a merged index with the overloading index for purposes of searching. As such, the process of associating facilitates searching updated portions within the overloading index corresponding to the modified content without rewriting the entire overloading index.

In a third aspect, the present invention provides a computerized method for updating a portion of an existing overloading index by way of collecting DUI objects and incorporating metadata conveyed thereby to the portion. In embodiments, the method involves one or more of the following procedures: crawling metadata underlying content of a set of documents to identify modifications recently made thereto; and constructing the DUI object. Typically, the DUI object includes an identifier of one or more documents within the set of documents to which the identified modifications are made, indicia of a relative position of the modified content therein, and a representation of the metadata underlying the modifications. The method may further involve communicating a notification to a network manager to allocate an agent component to retrieve the DUI object. In response to the notification, the network manager instructs the allocated agent component to download the DUI object. However, incident to downloading the DUI object, an update process that dynamically applies the DUI object to overloading index is initiated.

In one instance, the update process may include the following procedures, in no particular order: referencing a mapping schedule at the merged index upon receiving the instructions from the network manager; utilizing the mapping schedule to attain an absolute location of the modified content utilizing the identifier of the documents in conjunction with the relative position; and writing the modified content and the corresponding absolute location to the overloading index. An association process may be periodically performed that groups the merged index with the overloading index for the purposes of searching.

As used herein, the phrase "overloading index" is not meant to be limiting, but may encompass any form of index. In one instance, the overloading index is an inverted index that maps the changed terms with the modified location and metadata in the index. In embodiments, each term in the index may have metadata associated with it. For instance, a term "Price" might have metadata associated with it, where the metadata indicates the price of an object. Accordingly, the overloading index organizes and stores this new updated metadata.

Having briefly described an overview of embodiments of the present invention, an exemplary operating environment suitable for implementing embodiments of the present invention is described below.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as component programs, being executed by a computer or other machine, such as a personal data assistant or other handheld device. Generally, component programs including routines, programs, objects, components, data structures, and the like refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
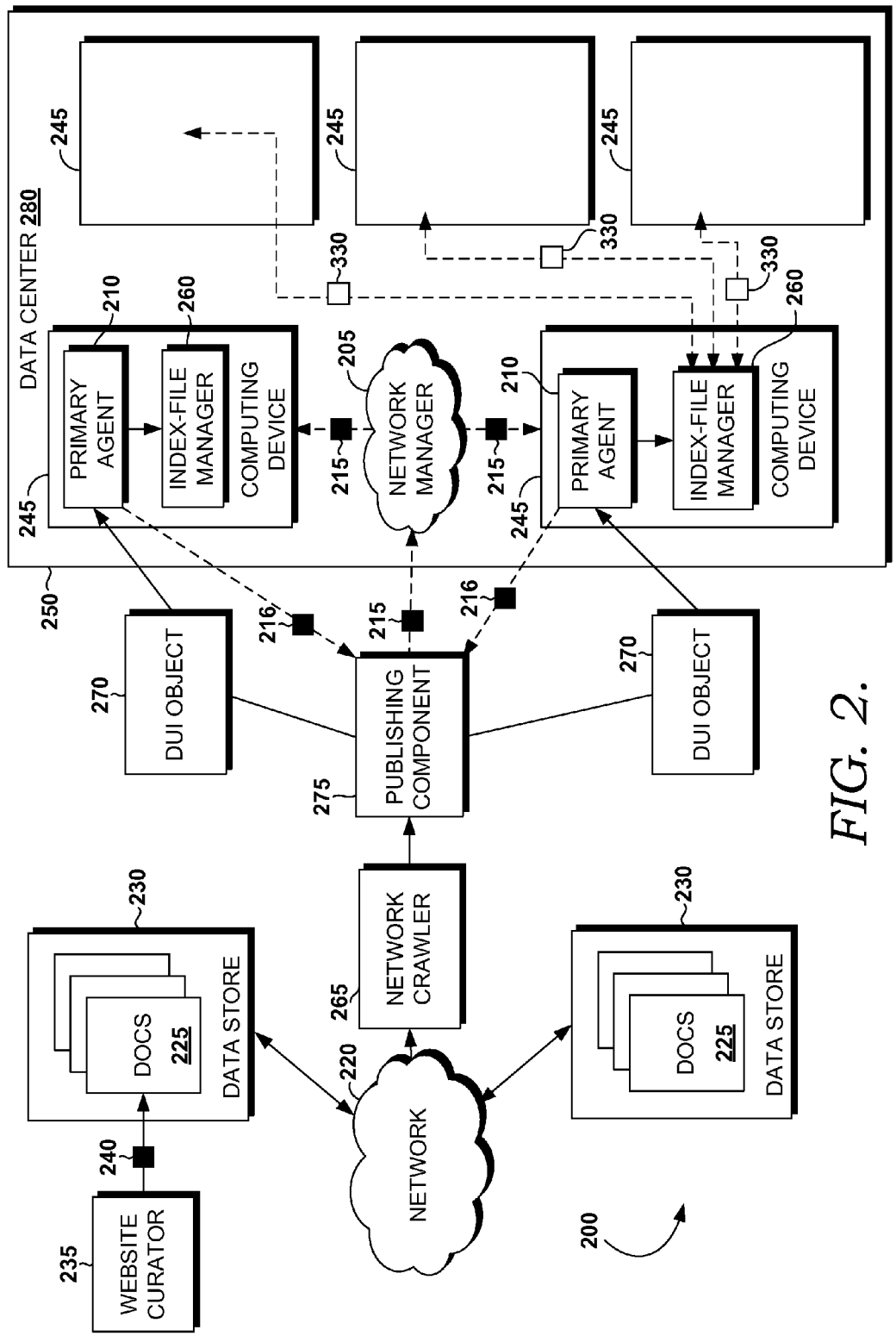
FIG. 2 is a block diagram of an exemplary system according to an embodiment of the present invention.

Turning now to FIG. 2, a block diagram is illustrated, in accordance with an embodiment of the present invention, showing a system 200 configured to generate an updated overloading index. It will be understood and appreciated by those of ordinary skill in the art that the system 200 shown in FIG. 2 is merely an example of one suitable computing system environment and is not intended to suggest any limitation as to the scope of use or functionality of embodiments of the present invention. Neither should the system 200 be interpreted as having any dependency or requirement related to any single component or combination of components illustrated therein. Further, the system 200 may be provided as a stand-alone product, as part of a software development environment, or any combination thereof.

The system 200 includes one or more user computing devices 245 within a data center 280, a network crawler 265, a publishing component 275, and one or more data stores 230, all in communication with one another. Generally, components (e.g., network crawler 265, publishing component 275, network manager 205) of the exemplary system 200 may be interconnected by any method known in the relevant field. In embodiments, a network 220 is provided to facilitate communication between the data stores 230 and the computing devices 245 of the data center 280. For instance, the data stores 230 and the data center 280 may be operably coupled via the network 220 comprising a distributed communications environment. In one example, the network 220 may be wireless and may include, without limitation, one or more local area networks (LANs) and/or wide area networks (WANs). Such networking environments are commonplace in offices, enterprise-wide computer networks, intranets, and the Internet. In addition, many more components (e.g., BTSs, devices, and the like) may be operably coupled to wireless network 220.

In yet other embodiments, the network 220 of FIG. 2 may couple components 205, 210, 260, 265, and 275, thereby forming a distributed computing environment where tasks are performed by remote-processing devices that are linked through appropriate connections. These connections may be established by wired technologies, wireless technologies, or a combination thereof. Examples of particular wired embodiments, within the scope of the present invention, include USB connections and cable connections. Examples of particular wireless embodiments, within the scope of the present invention, include a near-range wireless network and radio-frequency technology. It should be understood and appreciated that the designation of "near-range wireless network" is not meant to be limiting, and should be interpreted broadly to include at least the following technologies: negotiated wireless peripheral (NWP) devices; short-range wireless air interference networks (e.g., wireless personal area network (wPAN), wireless local area network (wLAN), wireless wide area network (wWAN), Bluetooth™, and the like); wireless peer-to-peer communication (e.g., Ultra Wideband); and any protocol that supports wireless communication of data between devices. Additionally, persons familiar with the field of the invention will realize that a near-range wireless network may be practiced by various data-transfer methods (e.g., satellite transmission, telecommunications network, etc.) that are different from the specific illustrated embodiments. Therefore it is emphasized that embodiments of the connections between components are not limited by the examples described, but embrace a wide variety of methods of communications.

The distributed computing environment of the exemplary system 200 includes the data center 280 configured to accommodate and support operation of the component programs 205, 210, 260, and optionally 265 and/or 275 utilizing one or more of the computing devices 245. It will be understood and appreciated by those of ordinary skill in the art that the data center 280 shown in FIG. 2 is merely an example of one suitable for accommodating one or more of the component programs and is not intended to suggest any limitation as to the scope of use or functionality of embodiments of the present invention. Neither should the data center 280 be interpreted as having any dependency or requirement related to any single component combination of components, resources (not shown), or set of APIs to access the resources (not shown). Further, although the various blocks of FIG. 2 are shown with lines for the sake of clarity, in reality, delineating various components is not so clear, and metaphorically, the lines would more accurately be grey and fuzzy.

Further, it should be noted that embodiments of the present invention are not limited to implementation on such physical resources (e.g., computing devices 245) illustrated in FIG. 2, but may be implemented on any of a variety of different types of computing devices, equipment, and component programs within the scope of embodiments hereof. In other words, illustrated computing device 245 of the data center 280 depict an exemplary configuration that is intended for discussion purposes only; accordingly, any suitable layout of computing devices, and instances of the component programs residing thereon, known in the computing industry may be used and is contemplated by the present invention.

Each of the computing devices 245 shown in FIG. 2 may be any type of computing device, such as, for example, computing device 100 described above with reference to FIG. 1. By way of example only and not limitation, each of the computing devices 245 may be a server, a personal computer, processing blade(s), server, desktop computer, laptop computer, handheld device, mobile handset, consumer electronic device, and the like. Additionally, the computing devices 245 may further include a keyboard, keypad, stylus, joystick, and any other input-initiating component that allows a user to access wired or wireless data on the network 220. It should be noted, however, that the present invention is not limited to implementation on such computing devices, but may be implemented on any of a variety of different types of computing devices within the scope of embodiments hereof.

In addition, each of the computing devices 245 may be provisioned with hardware that facilitates the reception of messages over the Internet supported by the network 220 and/or pathways within an intranet supported by the data center 280. These messages may include communications (e.g., notification 215, request 216, DUI object 270, and the like) that are consistent with processing modifications to documents 225 maintained at the data stores 230 or updating a merged index with those modifications. The communications may be transmitted at the commencement or ending of establishing a connection, or at any time(s) therebetween. In addition, hardware is disposed on the computing device 245 capable of transmitting the messages at any rate, or at predefined periods of time.

Typically, the hardware is configured as, or is linked to, some form of a computing unit (e.g., central processing unit, microprocessor, etc.) to support operations of the component(s) running thereon (e.g., network manager 205 of FIG. 2). As utilized herein, the phrase "computing unit" generally refers to a dedicated computing device with processing power and storage memory, which supports operating software that underlies the execution of applications and computer programs installed thereon. In one instance, the computing unit is configured with tangible hardware elements, or machines, that are integral, or operably coupled, to each device that perform update-related processes (e.g., update process, merge process, and the like) and other operations (e.g., generate the DUI objects). In another instance, the computing unit may encompass a processor coupled to the computer-readable medium accommodated by the computing devices 245. Generally, the computer-readable medium stores, at least temporarily, a plurality of computer software components (e.g., components 205, 210, 260, 265, and 275 of FIG. 2) that are executable by the processor. As utilized herein, the term "processor" is not meant to be limiting and may encompass any elements of the computing unit that act in a computational capacity. In such capacity, the processor may be configured as a tangible article that processes instructions.

In an exemplary embodiment, processing may involve fetching, decoding/interpreting, executing, and writing back instructions (e.g., saving an updated overloading index or merged index to the computer-readable memory).

Also, beyond processing instructions, the processor may transfer information to and from other resources (not shown) that are integral to, or disposed on, the data center 280. Generally, resources refer to software and hardware mechanisms that enable the data center 280 to perform a particular function. By way of example only, the resources may include one or more of the following mechanisms: imaging apparatuses (e.g., user-interface display); data stores; printing devices; paging systems; audio alert devices; and media-display units.

The data stores 230 are generally configured to store information associated with the documents 225. In various embodiments, documents 225 may include, without limitation, metadata, files (e.g., web page), folders, and/or data related to a website. As discussed herein, metadata may be any piece of information that describes a portion of one or more of the documents 225. For example, the language of one of the documents 225 may be metadata. Metadata, in general, is data that describes any type of information in the documents 225, such as a web page document. By way of example, a meta word is a word that describes an aspect of a document (e.g., a characteristic of a document, an element of a document, a term, a price, a character, a phrase, and the like). Further, meta words are typically not located or included within the documents 225, but may represent an element found within the documents 225 or a characteristic of that document. Other meta words may include, but are not limited to, language (e.g., language of a web document), location (e.g., country of origin of a web document), or type (e.g., type of a web document).

In addition, the data stores 230 may be configured to be searchable for suitable access of stored information. For instance, the data stores 230 may be searchable for one or more modifications 240, additions, or deletions associated with one or more of the documents 225. It will be understood and appreciated by those of ordinary skill in the art that the information stored in the data stores 230 may be configurable and may include any information relevant to the merged index update process. The content and volume of such information are not intended to limit the scope of embodiments of the present invention in any way. Further, though illustrated as two, independent components, the data stores 230 may, in fact, be a plurality of databases, for instance, a database cluster, where portions of which may reside on one or more of the computing devices 245, a search engine (not shown), another external computing device, and/or any combination thereof.

Although frequently used herein, the phrase "web document" is not meant to limit the scope of the system 200 described herein. That is, the system 200 is not limited to indexing only web documents but also indexes documents of various other types ingested by other mechanisms. These documents might be provided by vendors or by automatic processes different from WWW (e.g., dumps of binary data, SQL data dumps, feeds, etc). Further, the updates to these documents might also be provided by different mechanisms.

As shown in FIG. 2, the exemplary system 200 includes various component programs such as the network manager 205, the primary agent 210, the index file manager 260, the network crawler 265, and the publishing component 275. In some embodiments, one or more of the illustrated components 205, 210, 260, 265, and 275 may be implemented as stand-alone applications. In other embodiments, one or more of the illustrated components 205, 210, 260, 265, and 275 may be integrated directly into the operating system of the data center 280, the data stores 230 and/or one or more of the computing devices 245. It will be understood by those of ordinary skill in the art that the components 205, 210, 260, 265, and 275 illustrated in FIG. 2 are exemplary in nature and in number and should not be construed as limiting. Any number of components may be employed to achieve the desired functionality within the scope of embodiments of the present invention.

In operation, the components of the exemplary system 200 perform one or more of the functionalities discussed below. But, embodiments of the present invention are not limited to the specific functionalities described, and may include alternative processes that achieve the results that are attained by the following component functions. Initially, a modification 240 may be made to one or more of the documents 225 stored at one or more of the data stores 230. In one instance, the modification 240 may by applied to the content of the document(s) 225. This type of modification 240 typically involves a change initiated by a website curator 235, or any other entity that wields administrative control over the document(s) 225. By way of example, the modification 240 made to content of the document(s) 225 may involve altering at least one term within a web page posted online. For instance, the term may be a price value associated with an item for sale at a retail-based web page.

Although several different configurations of the modification 240 to the document(s) 225 have been described, it should be understood and appreciated by those of ordinary skill in the art that other types of suitable techniques (manually/automatically employed by entities that have rights to edit the document(s) 225) that result in altering any portion of the document(s) 225 (e.g., metadata underlying content and terms of the document(s) 225) may be used, and that embodiments of the present invention are not limited to those modifications 240 described herein.

The network crawler 265 is generally configured to express the indication of the modification 240 to the document(s) 225 upon performing an examination procedure. Initially, the network crawler 265 may access the document(s) via the network 220. Alternatively, the network crawler 265 may be partially distributed onto one or more of the data stores 230, or may be a stand-alone element that remotely monitors the modifications 240 without reading the document(s) 225. In one instance, the examination procedure involves crawling the document(s) 225 within a monitored set of documents that fall within a predetermined scope of websites searchable via the merged index 295. In another instance, the examination procedure involves detecting the modifications 240, such as an adjustment to metadata underlying the content of the document(s) 225 within the set of documents. Detecting the modifications 240 may be carried out utilizing any analytical process know to those of ordinary skill in the relevant field. By way of example, detecting may be accomplished by comparing a previous cached version of a document against the document(s) 225 currently maintained by the data stores 230 to discover and locate any inconsistencies. Further, the examination procedure performed by the network crawler 265 may be executed a regular intervals, at predefined periods of time, in a real-time fashion (e.g., triggered by the website curator 235 accessing and editing the content of the document(s) 225), or any other manner that promotes effective detection of the modifications 240.

Upon the network crawler 265 crawling the set of documents and performing the examination procedure thereto, the modification 240 may be detected. In an exemplary embodiment, upon detecting the modification 240 (e.g., recognizing that terms have changed in the website), the network crawler 265 may inform the publishing component 275 of the modification 240 and of its relative position within the document(s) 225 that received the change. Upon being informed of the modification 240, the publishing component 275 automatically performs at least two operations: generating a DUI object 270 and a providing a notification 215 to the network manager 205.

Figure 3:
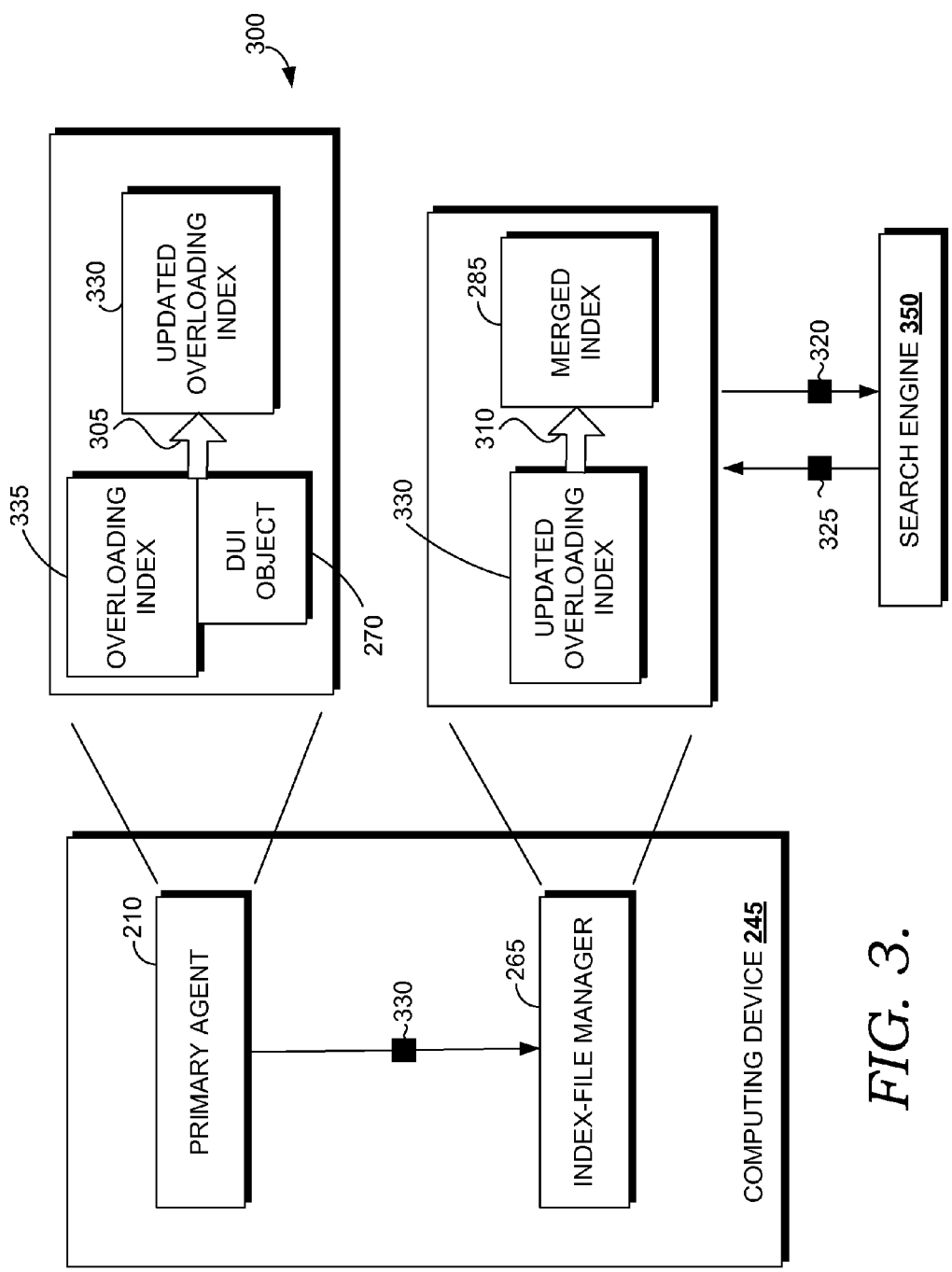
FIG. 3 is a block diagram of an exemplary computing device for executing an update process and an association process, in accordance with an embodiment of the present invention.

Generating the DUI object 270 involves various procedures that involve to packaging information related to the modification 240 into a format that may be applied to an overloading index (see reference numeral 335 of FIG. 3). In embodiments, the information includes the data (e.g., terms, content, underlying metadata, and the like) that is modified, characteristics of the modification 240 (e.g., relative position in the document(s) 225), and an identification of the document(s) 225 receiving the modification 240. In embodiments, the identification of the document(s) 225 may include one or more of the following: URL; web page address; location of the website of the data store 225; or the data associated with a source of the modification 240. This identification of the document(s) 225 may be converted by the publisher component 275 into a document identifier. By way of example, the publishing component 275 may be configured to derive the identifier of the altered document(s) 225 based on a uniform resource located (URL) associated with an online location of the document(s) 225. In this example, the identifier is a unique description of the altered document(s) 225 within the monitored set of documents. In one embodiment, upon acquiring the identifier of the document(s) 225 that received the modification 240, the publishing component 275 may carry out the steps of ascertaining a relative position of the modified content within the document(s) 225, and composing the DUI object 270 to include the identifier, indicia of the relative position, and a representation of metadata underlying the modified content.

In a particular embodiment, the DUI objects 270 may reference a map at the merged index. The map can make a correlation between altered terms (words) and the associated document identifiers and an absolute location within the set of documents. The DUI objects may include expressions of a relative position of the altered terms inside the document(s) 225. These relative positions may be subsequently translated into absolute locations that correspond to entries of the overloading index, and may be subsequently merged with overloading index. Merging the information carried in the DUI object 270 with the overloading index may be conducted in real-time (e.g., upon receiving an indication that the modification 240 has occurred, or upon generating the DUI object 270), upon a periodic time frame (e.g., once per minute), or on demand as instructed by the network manager 205.

As more fully discussed below, the format of the overloading index may be substantially similar to that of the merged index. But, the overloading index format is populated with aspects of just those terms that have changed (delta information). In one instance, the aspects of the terms that are populated into the format of the overloading index utilizing the DUI object 270 include the identification of the altered document(s) 225, characteristics of the modification 240 (e.g., new underlying metadata), and where (e.g., relative position) the modification 240 occurred within the document(s) 225. Although a specific set of data associated with the modification 240 is utilized for creating an entry within the overloading index, discussed in the exemplary embodiment above, one of ordinary skill in the relevant field would appreciate and understand that other data sets that describe and locate the modification 240 may be used. For instance, Cartesianal coordinates of the altered term within the document(s) 225 may be employed to portray the relative position of the modification 240.

In one instance, the publishing component 275 may access an independent service and/or an internal scheme that maintains an up-to-date mapping schedule that the URL or the web page address of the altered document(s) 225 with a unique identifier of the associated document(s) 225. As such, the mapping schedule may be used to transcribe the URL or web page address into the appropriate document identifier. In order to decipher the document identifier upon receipt, the mapping schedule may be transferred within the DUI object 270.

In addition, the detected changes to terms and/or related metadata may be written to the DUI object 270. In particular instances, the metadata that governs the subject matter of a term (e.g., value of a price appended to an item) may be transformed according to a formatting scheme of the DUI object 270 and incorporated therein. Also, the location of the changed terms within the content of the document(s) 225 may be appended to the DUI object 270. As such, in an exemplary embodiment, the DUI object 270 articulates the indicia of a relative position of the modified term within the content of the document(s) 225 (e.g., posted web page), a representation of the metadata underlying the modified term, and an identifier of the document(s) 225.

Although an exemplary configuration of the DUI object 270 been described above, it should be understood and appreciated by those of ordinary skill in the art that other types of suitable configurations that identify the updated document and expose properties of the update itself may be used, and that embodiments of the present invention are not limited to those organizations of the DUI object 270 described herein. For instance, the DUI object may include the URL of the altered document(s) 225 and/or an absolute location of the modification 240, where the absolute location is compatible with the content locators stored at the merged index.

A second operation performed by the DUI publisher 275 involves conveying the notification 215 to the network manager 205. In embodiments, the notification 215 is a specific message composed by the publishing component 275 that informs the network manager 205 of the modification 240 and provides a description of attributes related to the modification 240. In other embodiments, the DUI publisher 275 publishes a segment of the DUI object 270, or the entirety of the DUI object 270, thereby exposing the updated content and identifying the affected document(s) 225 with some form of indicator (e.g., URL, web page address, and the like).

The network manager 205, upon recognizing the DUI object 270 is generated, is configured to instruct the primary agent 210 to initiate an update process that creates or updates the overloading index. In one instance, the network manager 205 governs a collection of interacting machines (e.g., computing devices 245) within the data center 280. One or more of the computing devices 245 within this collection of machines are configured to manage the merged index, which is employed to search content of a plurality of documents with the set of documents. By way of example, the network manager 205 includes an Index Serving Node Manager that registers indicia, or metadata, of the DUI objects 270.

Other responsibilities of the network manager 205 include managing the distribution of the DUI objects 270 to index-file managers 260 installed on the computing devices 245 (e.g., index serve machines (ISM's) within an index-serving bed) of the data center 280. Managing the distribution of the DUI objects 270 may involve allocating one or more of the primary agents 210 for downloading the DUI object 270. This allocation may be based on the contents or configuration of the overloading index managed by each of the primary agents 210.

Upon the network manager 205 instructing the allocated primary agent(s) 210 (e.g., ISAgents) to download the DUI objects 270, the primary agents 210 execute a real-time merge. In embodiments, an update process is performed that applies the downloaded DUI objects 270 to the overloading index to create an updated overloading index 330. That is, the update process promotes retrieving the DUI object 270 and dynamically applying the DUI object 270 to overloading index. Typically, the overloading index maintains a structured record of additions, deletions, and modifications 240 to the set of documents within the scope thereof.

Initially, the update process involves downloading the DUI object 270 by transmitting a request 216 to the publishing component 275 to send the DUI object 270 thereto. In response to the request 216, the publishing component 275 may push metadata to the network manager 205 and the DUI objects 270 onto one or more of the primary agents 210 allocated by the network manager 205 to receive the DUI objects 270. The DUI objects 270 may be redistributed to the balance of the primary agents 210 within the data center 280 that are selected for the receiving the DUI objects 270. In another instance, the DUI objects 270 are automatically distributed to the primary agent 210 upon generation of the DUI object 270, upon the elapse of a predefined time interval, or at a predefined time period.

The update process may further include one or more of the following procedures, in no particular order: referencing the mapping schedule upon receiving the instructions to download the DUI object 270; and utilizing the mapping schedule to translate the identifier of the document(s) 225 to a web page address or URL. This mapping schedule, or scheme, may be carried in association with the document identifier within the DUI object 270. In another embodiment, the mapping schedule may be interconnected with the primary agent 210, may be provided by the overloading index, or may be accessed at a separate location (e.g., the merge index). In other embodiments, the mapping schedule associates the document identifier with an address of the altered document(s) 225 and associates the relative position of the modification 240 within the altered document(s) 230 to the absolute location of the modification 240 within the set of documents. Accordingly, the update process involves updating the overloading index with information transmitted in each DUI object 270 as it is downloaded while concurrently translating the transmitted information to correspond with the format and organization of the overloading index. Accordingly, merging the DUI objects 270 to the overloading index requires a significantly smaller amount of time and resources as compared to merging all the DUI objects 270 that have accumulated over particular timeframe (e.g., thousands of DUI objects 270 may be collected prior to a once-daily aggregation to a merged index).

In embodiments, upon deciphering the web page address or URL of the altered document(s) 225 from the identifier, the update process may further include utilizing the web page address or URL to derive an absolute location of the modified content within the monitored set of documents from the relative position of the modification 240. This absolute location (global within the set of documents) of the modification 240 may be saved, at least temporarily, to overloading index. In other embodiments, saving data to the overloading index involves the interaction of the DUI object 270 with the existing overloading index such that obsolete references to content within the set of documents may be referenced and replaced. Or, if the references to content that is recently modified do not currently exist, the modifications 240 transported by the DUI objects 270 may be entered to the overloading index as updated content, terms, or metadata coupled with an absolute located of the content, terms, or metadata.

With reference to FIG. 3, an embodiment of the update process 305 will now be discussed. In general, FIG. 3 depicts a block diagram 300 that illustrates an exemplary computing device 245 for executing the update process 305 and an association process 310, in accordance with an embodiment of the present invention. A depicted, the primary agent 210 merges downloaded DUI object 270 with the overloading index 335 to arrive at an updated overloading index 330. As discussed above, the update process 305 may be implemented in real-time upon receiving a notification from the network manager 205 (creating a new real-time merged index upon receiving a single change to the set of documents), at a recurring time frame, or at any other predefined time period. The updated overloading index 330 may be submitted to the index-file manager 265. Upon receiving the updated overloading index 330, the index-file manager 265 may perform the association process 310 that is generally designed to group the update overloading index 330 with the existing merged index for the purposes of searching.

In embodiments, the updated overloading index 330 is generated, as discussed above, upon applying just those recent modifications to the set of documents, such as updated metadata, to the targeted portions of the merged index. Because, the entire overloading index 335 is not replaced, and because only the updated information is applied, which in many cases may be a very small portion of the entire merged index, the update process 305 is an intelligent operation that conserves processing time and resources. Accordingly, the update process 305 of the present invention may be invoked more frequently, thereby providing an up-to-date updated overloading index 330 that is responsive to, and reflective of, changes to the set of documents.

In an exemplary implementation, the update process 305 may be configured for updating the corresponding meta words in the overloading index 335 with the associated document identifications and associated data, such as the meta word values and the locations for the meta words. In this implementation, a particular meta word may be located in the overloading index 335 that requires updating by using the location information (e.g., relative position, absolute location, and the like) received, as discussed above. The update process 305 may recursively locate each meta word that has associated updated information. As such, embodiments of the present invention do not replace the entire overloading index 335 with new information, but may update any number of meta words at one time. For example, one meta word may be replaced, while the other information in the overloading index 335 may not change.

Turning back to FIG. 2, in embodiments, the index-file manager 260 is designed to implement the association process at regular intervals (e.g., hourly, daily, weekly, etc.) or in real-time upon the index-file manager 265 becoming aware of the updated overloading index 330. As such, it should be understood that the update process and the association process may be linked in implementation, or may be triggered independently. Upon completion of the update process, the updated overloading index 330 is created. The updated overloading index 330 may be conveyed to other primary agents 210 that are disparately located throughout the data center 280. These locations in the data center 280 may correspond to rows of machines where each row has a complete copy of the merged index.

In embodiments, the primary agents 210 are provided to load the overloading index 330 within one or more of the plurality of computing devices 245 incident to invoking the association process. In embodiments, the primary agent 210 is installed on at least one of the plurality of computing devices 245 (e.g., rows of machines). In embodiments, the primary agent 210 is configured to take offline the rows one at a time, to preserve web-search functionality, when replacing portions of the overloading index. Taking a row of machines, or a single machine, offline may occur for a duration of a very short period of time because the update process is refined to replace only those obsolete portions of the overloading index. That is, conducting the update process, as described herein, allows for frequently amending the overloading index with only the affected portions of the documents. In another embodiment of the update process, the updated overloading index is loaded alongside the existing merged index 285. In this embodiment, during a user-initiated search, the updated overloading index takes preference over existing merged index 295.

As discussed herein, the phrase "merged index" is not to be construed as limiting and may encompass an arrangement of items that is searchable with a query and generally utilized to discover content related, in some aspect, to the query. In one instance, the merged index is organized as an inverted index that is searchable for content within the monitored set of documents upon receiving a query from a user. In this instance, similar to the index of a book, the inverted index lists each meta word received. For each meta word received, the inverted index may list each document identification that is associated with that meta word. In addition to listing each associated document identification, associated data may also be listed for each meta word.

With reference to FIG. 3, upon attaining the updated overloading index 330, the set of documents within the scope of the updated overloading index 330 may be efficiently searched for content utilizing the updated overloading index 330 is association with the merged index, in that order. That is, recent changes to the set of documents are expediently incorporated into the updated overloading index 330 utilizing the DUI object 270. Accordingly, a user-initiated online search via a search engine 350, which is operably coupled to the updated overloading index 330 and the merge index 285, will generally produce current search results (e.g., most recent price value associated with sale items). In one embodiment of an online search, the search engine 320 will communicate a query 325 for specific information contained in one or more of the documents to the updated overloading index 330 then the merged index 285 that, in turn, provides search results 320 that reflect the updated metadata.

Figure 4:
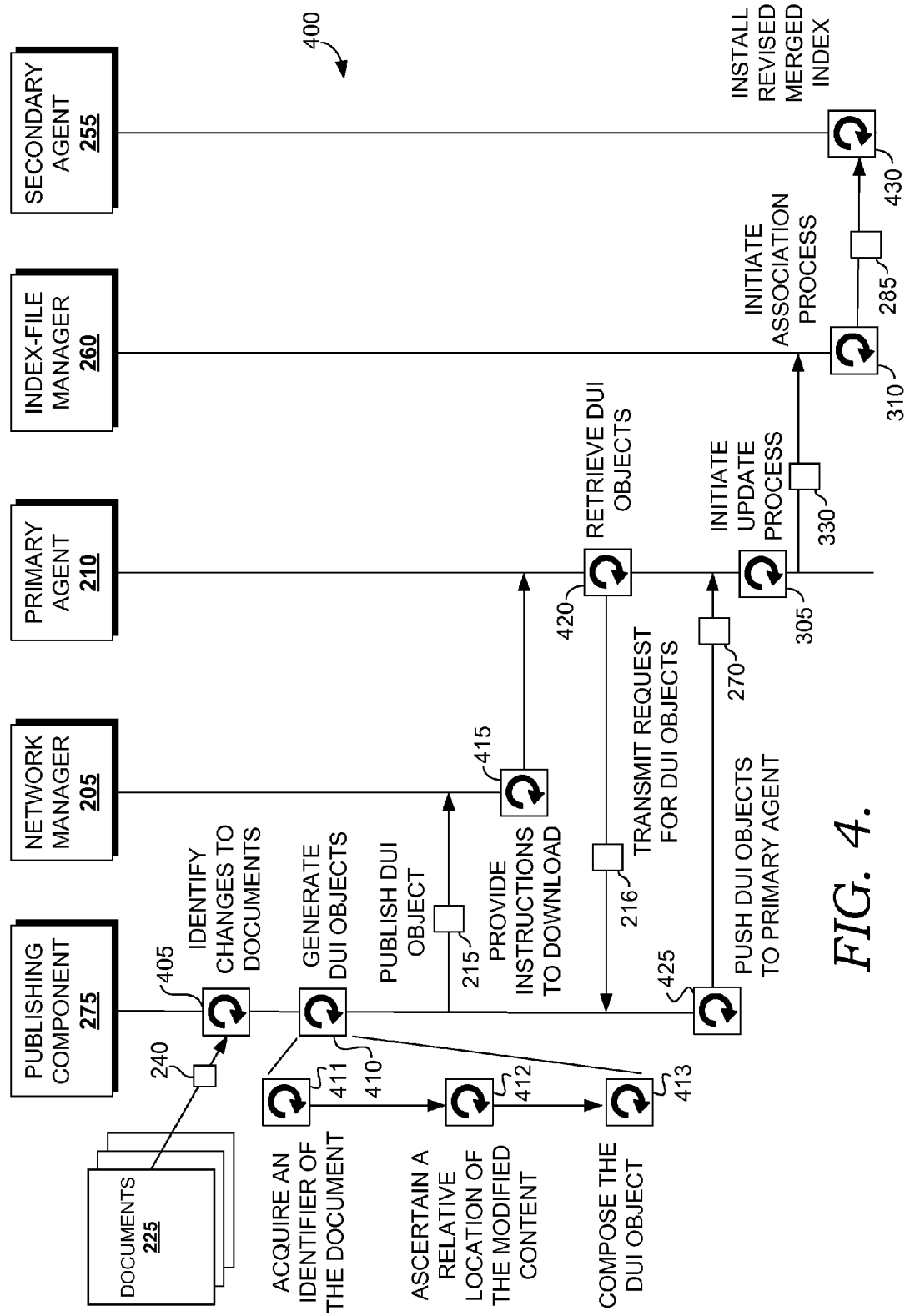
FIG. 4 is an operational flow diagram illustrating a high level overview of a technique for performing the update process and the association process of one embodiment of the present invention.

Referring to FIG. 4, an operational flow diagram 400 is illustrated that depicts a high level overview of a technique for performing an update process and a merge process of one embodiment of the present invention. In embodiments, the publishing component 275 identifies changes (e.g., the modifications 240 of FIG. 2) that have been made to the document(s) 225 (e.g., utilizing the network crawler 265 of FIG. 2), as depicted by operation 405. In one example, the modification occurring to the content of the documents involves a curator-initiated change to at least one term within a web page posted online. In real time, or in accordance with a time schedule, the publishing component 275 generates the DUI objects, as depicted by operation 410. Operation 410 may involve a variety of procedures that may include the following: acquire an identifier of the document (see procedure 411); ascertain a relative location of the modified content (see procedure 412); and compose the DUI object (see procedure 413). With reference to the example above, the generated DUI object articulates indicia of a relative position of the modified term within the content of the posted web page, as well as a representation of the metadata underlying the at least one modified term.

Upon generating the DUI object, the publishing component 275 may publish the DUI object by conveying a notification 215 to the network manager 205. In response, the network manager 205 may allocate primary agent(s) 210 to receive the DUI object and provide instructions to the allocated primary agents 210 to download the DUI object, as depicted at operation 415. In response, as depicted at operation 420, the primary agent(s) 210 may attempt to retrieve the DUI objects by transmitting a request 216 for the DUI object to the publishing component 275. Upon receiving the request 216, the publishing component 275 may push the DUI object 270 to the primary agent 210.

As discussed more fully above, the primary agent 210 is configured to initiate an update process 305 that applies the DUI object 270 to overloading index. The primary agent 210 hands the updated overloading index 330 to the index-file manager 260 to perform the association process 310 that invokes grouping the merged index with the updated overloading index 330 for purposes of searching. The resulting updated overloading index 330 is communicated to the primary agent 210, which is configured to install the updated overloading index 330 to a machine within the data center.

Figure 5:
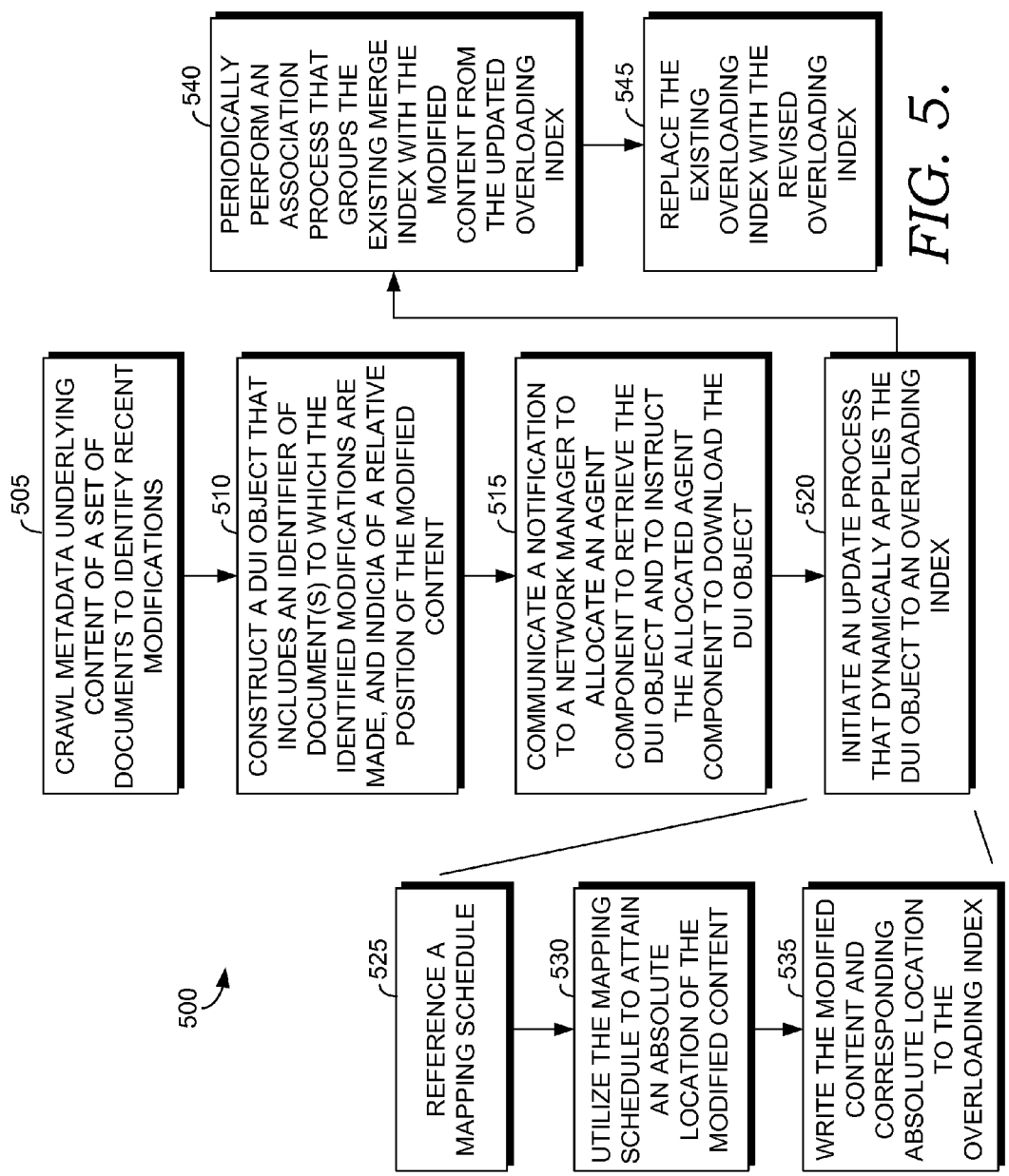
FIG. 5 is a flow diagram of an overall method for dynamically updating an overloading index utilizing one or more DUI objects, in accordance with an embodiment of the present invention.

Turning now to FIG. 5, a flow diagram of an overall method 500 for dynamically updating an overloading index utilizing DUI objects is shown, in accordance with an embodiment of the present invention. Although the terms "step" and "block" are used hereinbelow to connote different elements of methods employed, the terms should not be interpreted as implying any particular order among or between various steps herein disclosed unless and except when the order of individual steps is explicitly described. In embodiments, updating the overloading index employs a computerized method for updating a portion of an existing overloading index by way of collecting DUI objects and incorporating metadata conveyed thereby to the portion. Initially, the computerized method includes the steps of crawling metadata underlying content of a set of documents to identify modifications recently made thereto (see block 505) and constructing the DUI object (see block 510). In one instance, the DUI object includes an identifier of one or more documents within the set of documents to which the identified modifications are made, indicia of a relative position of the modified content therein, and a representation of the metadata underlying the modifications. As depicted at block 515, a notification is communicated to a network manager publicizing the DUI object is generated. In response, the network manager may allocate an agent component to retrieve the DUI object and/or instruct the allocated agent component to download the DUI object.

Incident to downloading the DUI object, an update process is initiated that dynamically applies the DUI object to overloading index. In an exemplary embodiment, the update process includes the following steps: referencing a mapping schedule upon receiving the instructions from the network manager (see block 525); utilizing the mapping schedule to attain an absolute location of the modified content utilizing the identifier of documents in conjunction with the relative position (see block 530); and writing the modified content and the corresponding absolute location to the overloading index (see block 535).

Upon generating the updated overloading index, the method 300 may include periodically performing an association process that groups the existing merged index with the modified content within the updated overloading index to ostensibly create a single. This is depicted at block 540. In embodiments, the process of merging overwrites the portion within the merged index corresponding to the absolute location of the modified content without affecting other potions of the merged index. Incident to deriving the revised merged index, the existing merged index is replaced with the revised merged index, as depicted at block 545.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the methods. It will be understood that certain features and sub-combinations are of utility and may be employed without reference to other features and sub-combinations. This is contemplated by and is within the scope of the claims.

What is claimed is:

1. One or more computer-readable storage devices having computer-executable instructions embodied thereon that, when executed, perform a method for dynamically targeting and updating portions of an overloading index utilizing a dynamic update of index (DUI) object that exposes modified content of one or more documents, searchable via a merged index, the method comprising:
 receiving an indication that a modification has occurred to the content of the one or more documents;
 generating the DUI object that identifies one or more of the documents and exposes the modified content;
 publishing the DUI object to a network manager, wherein the network manager exposes an indication of the DUI object to an agent;
 receiving a request from the agent to download the DUI object;
 in response to the request, sending the DUI object to the agent for use in updating an overloading index; and
 invoking an association process to group the merged index with the overloading index to facilitate searching updated portions within the overloading index corresponding to the modified content without rewriting the entire overloading index.

2. The storage device of claim 1, wherein generating the DUI object comprises acquiring an identifier of the one or more documents that received the modification.

3. The storage device of claim 2, wherein generating the DUI object comprises ascertaining a relative position of the modified content within the one or more documents.

4. The storage device of claim 3, wherein generating the DUI object comprises composing the DUI object that includes the identifier, indicia of the relative position, and a representation of metadata underlying the modified content.

5. The computer-readable storage device of claim 4, wherein the modification occurring to the content of the one or more documents involves a curator-initiated change to at least one term within a web page posted online.

6. The computer-readable storage device of claim 5, wherein the DUI object articulates the indicia of relative position of the at least one modified term within the content of the posted web page.

7. The computer-readable storage device of claim 6, wherein the DUI object articulates a representation of the metadata underlying the at least one modified term.

8. The computer-readable storage device of claim 1, wherein the agent initiates an update process that applies the DUI object to overloading index and invokes updating the portions of the overloading index, which are targeted by the DUI object.

9. The storage device of claim 8, wherein generating the DUI object comprises composing the DUI object that includes the identifier, indicia of the relative position modified content, and a representation of metadata underlying the modified content.

10. The computer-readable storage device of claim 9, wherein the update process further comprises:
utilizing the relative position of the modified content, as specified by the DUI object, to target a portion of the overloading index; and
overwriting the targeted portion of the overloading index with the metadata underlying the modified content.

11. The computer-readable storage device of claim 9, wherein the update process comprises modifying the targeted portions of the overloading index, which correspond to the modified content, without rewriting the entire overloading index.

12. The computer-readable storage device of claim 11, wherein the update process further comprises:
referencing a mapping schedule residing at a merge index upon receiving the instructions from the network manager; and
utilizing the mapping schedule to translate the identifier of one or more documents to a web page address.

13. The computer-readable storage device of claim 12, wherein the update process further comprises:
utilizing the web page address to translate a relative position of the modified content, as specified by the DUI object, to an absolute location of the modified content within the one or more documents; and
at least temporarily, storing the absolute location of the overloading index.

14. The computer-readable storage device of claim 12, wherein publishing the DUI object comprises deriving the identifier of the one or more documents based on a uniform resource locator (URL) associated within the one or more documents, wherein the identifier is a unique description of a document within the one or more documents.

15. The computer-readable storage device of claim 9, further comprising:
determining that the modification has occurred to the content of the one or more documents by detecting an adjustment to metadata underlying the content of the one or more documents.

16. The computer-readable storage device of claim 9, wherein receiving an indication that a modification has occurred to the content of the one or more documents comprises receiving an indication that a modification has occurred to at least one term within the one or more documents, wherein metadata underlies the at least one modified term.

17. The computer-readable storage device of claim 16, wherein generating the DUI object further comprises incorporating a representation of the underlying metadata to the DUI object.

18. The computer-readable storage device of claim 17, wherein the update process further comprises replacing terms within a portion of the overloading index to be updated in accordance with the underlying metadata.

19. The computer-readable storage device of claim 1, wherein the overloading index comprises a structured record or additions, deletions, and modifications to the one or more documents.

20. The computer-readable storage device of claim 1, wherein the association process is invoked periodically.

* * * * *